Sept. 23, 1958 R. J. ANDERSON 2,853,247
CORNCOB CRUSHER INCLUDING A TOOTHED ROLL
AND ADJUSTABLY POSITIONED GRATE
Filed July 24, 1957 3 Sheets-Sheet 1
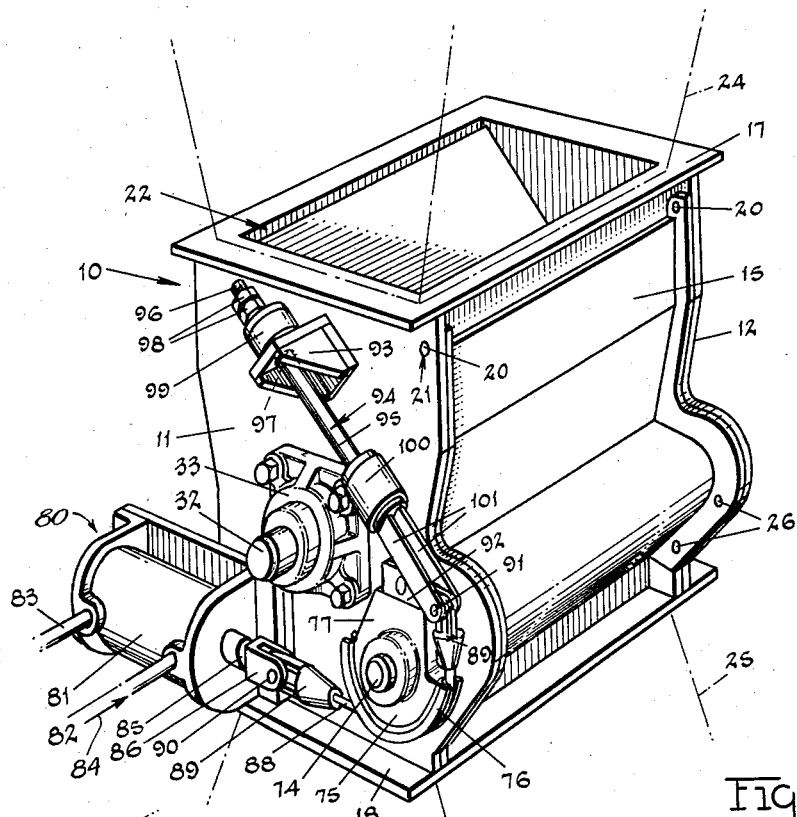
Fig 1
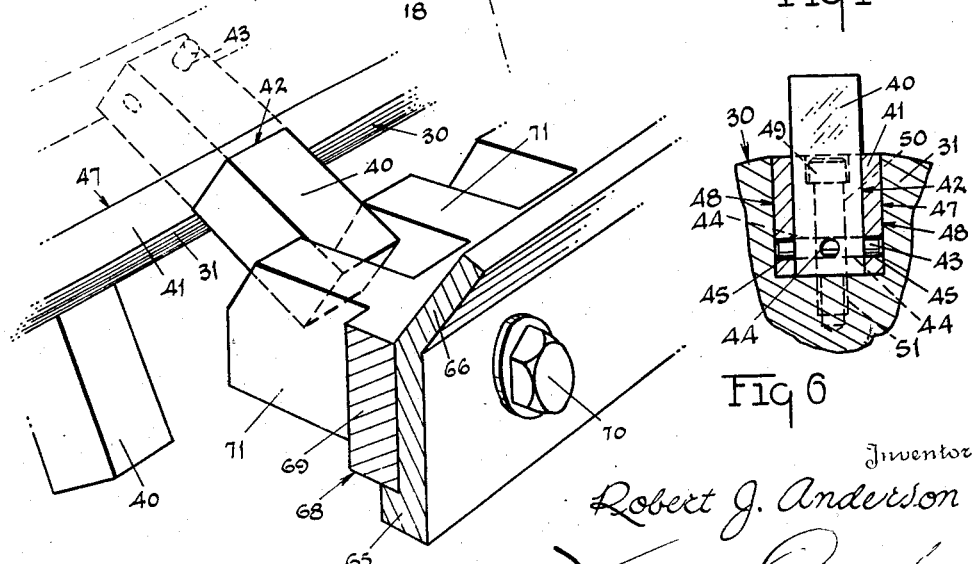
Fig 7   Fig 6
Inventor
Robert J. Anderson
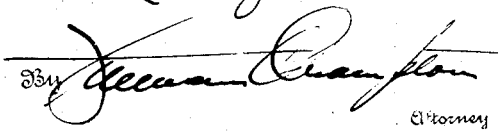
Attorney Sept. 23, 1958  R. J. ANDERSON  2,853,247
CORNCOB CRUSHER INCLUDING A TOOTHED ROLL
AND ADJUSTABLY POSITIONED GRATE Filed July 24, 1957  3 Sheets-Sheet 2

Inventor
Robert J. Anderson
By
Attorney

Sept. 23, 1958 R. J. ANDERSON 2,853,247
CORNCOB CRUSHER INCLUDING A TOOTHED ROLL
AND ADJUSTABLY POSITIONED GRATE
Filed July 24, 1957 3 Sheets—Sheet 3

Inventor
Robert J. Anderson
By
Attorney

United States Patent Office 2,853,247
Patented Sept. 23, 1958

2,853,247

CORNCOB CRUSHER INCLUDING A TOOTHED ROLL AND ADJUSTABLY POSITIONED GRATE

Robert J. Anderson, Maumee, Ohio, assignor to The Andersons, Maumee, Ohio, a partnership Application July 24, 1957, Serial No. 673,841

9 Claims. (Cl. 241—190)

My invention concerns the comminution of corncobs by a breaking process commonly called "crushing." The invention particularly relates to machinery for effecting a crushing of corncobs.

The increasing commercial importance of corncobs is illustrated by their increased use in many industries, examples of which are the distillation to obtain furfural; the compounding of cattle feeds; and the constructing of poultry litters and of blasting and polishing grits, to name a few. Most industrial uses of corncobs necessitate a degree of comminution of the cob. For example, a reduction to cubes ranging between ¼ to ¾ inch is required in constructing a corncob poultry litter and a reduction to between 12 and 35 mesh screen is required in making corncobs adaptable to use as a blasting and polishing grit. Some comminution may even be desirable to facilitate the storage, shipment or drying of the corncobs.

As a consequence, there is a growing need for machinery to crush corncobs. However, most cob crushing is presently done in machinery primarily designed to crush ore, shale, coal, old glass or plastic containers and the like or machinery having some slight adaptation of such crushers. All these machines lack the refinements needed in crushing corncobs that my invention has for one of its main purposes to provide. For example, in many of the machines in use today, the users thereof are obliged to permit the provision of a shear pin which keys the driven crushing roller with its driver source of power to take the entire responsibility for handling all machine overload problems. This, with its subsequent shut down and replacement of parts, as a consequence of pin shearing, is perhaps acceptable in the coal or ore crushing industries, but in the corncob crushing business, because of its seasonal nature, causes highly objectionable and hurtful delay. In the corncob crushing business, a simple overload release mechanism with a capacity to automatically reestablish itself after digesting an overload, is needed. My invention proposes to provide such an overload release mechanism.

Those machines in current use for corncob crushing which have means other than or auxiliary to a shear pin for handling machine overload have the further objection of being proportionally more resistant to digesting and overload as the size or displacement of the mass in the machine causing the overload increases. The consequence of this, in a great many cases, is that a needless strain is put on the machine, often resulting in breakage or shear of the machine parts. My invention proposes to provide overload means which is uniformly resistant to digesting overload without regard to the size or displacement of the mass in the machine causing such overload.

Another fault of machinery now in use for corncob crushing, which my invention proposes to remedy, is the lack of a simple means for making an adjustment whereby crushings of various size may be produced by the machine. This, in the prior art machines, requires the use of a variety of different size grids or grates or the unbolting, resetting and rebolting of the grid bar or crushing rollers in new and adjusted positions. In all machines of which I am aware, the operation of adjusting to vary the grind size requires a machine shut-down, with consequent loss of production, which in the corncob crushing industry may be at a critical period. My invention contemplates the provision of an adjusting means to vary the size of the crushing that may be operated even while the machine is running. The adjusting means my invention provides does not involve spare parts or the reorganization of the machine parts. This provision of my invention obviously avoids the shut-down period required to adjust machines in current use and, much more to the point, enables the machine operator to immediately test the consequence of an adjustment for size and make refining corrections, either to finer or coarser, as his specification may call for without the penalty of serious delay in production.

Still another fault of machinery for crushing cobs presently in use resides in the cumbersome manner in which the crushing roller thereof is constructed and the lack of a provision therein by which the elements thereof may be replaced as they wear, break or need to be adapted for various types of work. For example, in the currently used machines, the crushing roller is a laminated structure comprising a plurality of rings, bearing teeth and spacer land areas, threaded upon a central shaft and locked thereon much in the manner a stick of loose printer's type is locked together. When the replacement of one tooth on the crushing roller is needed, it is necessary to remove the entire crushing roller from its bearings and then, like beads on a string, remove all tooth and land parts threaded on the roller shaft between the broken tooth part and one end of the roller. Only then may the repair or replacement be effected. My invention proposes to provide a greatly simplified roller and tooth mounting means enabling not only substitution of teeth when needed but also making an adjusting movement of such teeth to bring unworn surfaces or edges thereof to bear and thus replace the worn surfaces or edges. All of this can be accomplished in rollers embodying my invention, without more than bringing the roller to a momentary rest to enable manual replacement or adjustment of the teeth.

My invention, in addition, has for its object to provide a crushing chamber to which access may be easily had, thus enabling the mentioned replacement and adjustment of teeth and the inspection, cleaning and maintenance of all other parts. To that end, my invention provides a housing comprising two opposite upstanding end plates and front and back upstanding plates, the back and end plates being connected along their vertical edges to form a three-sided enclosure in which the crushing roller and grate is housed. The front plate in the housing embodying my invention is pivotally connected at the upper ends of its vertical side edges to the upper ends of vertical side edges of the end plates thus to be free to swing open, like a clapper door, to permit access to within the housing and particularly to the zone between the roller and grate. Means, such as removable shear pins, engaging the front plate hold the front plate against movement, when the housing performs the function of producing a desired congestion and feeding of corncobs to the roller and grate for crushing. However, when the forces of congestion within the housing generate pressures likely to cause damage to the machine, particularly to cause a bursting of the housing, as occurs sometimes in overload, the shear pin means give way and allow the front plate to swing open and the congested mass within the housing to escape and spill outwardly, without effecting damage to the machine.

My invention has for further objects those of providing other advantageous structures and arrangements which will appear from the following description and from an examination of the accompanying drawings. Corncob crushers containing my invention may take various forms of which I have selected one to describe hereinafter, since it appears at present to me that the one I have selected is the best mode by which my invention may be carried out. In describing such form, I shall make reference to the accompanying drawings. However, I do not mean to imply by such reference or by the description which follows that variations from the form so described or illustrated are beyond the contemplation of my invention made manifest herein.

Figure 1 of the accompanying drawings illustrates a perspective view of the corncob crusher I have selected to illustrate an embodiment of my invention. I show the selected corncob crusher in operative relation to other mill elements shown in phantom line.

Figure 2 of the drawings illustartes an end view of the corncob crusher shown in Figure 1.

Figure 3 of the said drawings illustrates a view of a longitudinal section of the corncob crusher shown in Figure 2.

Figure 2:
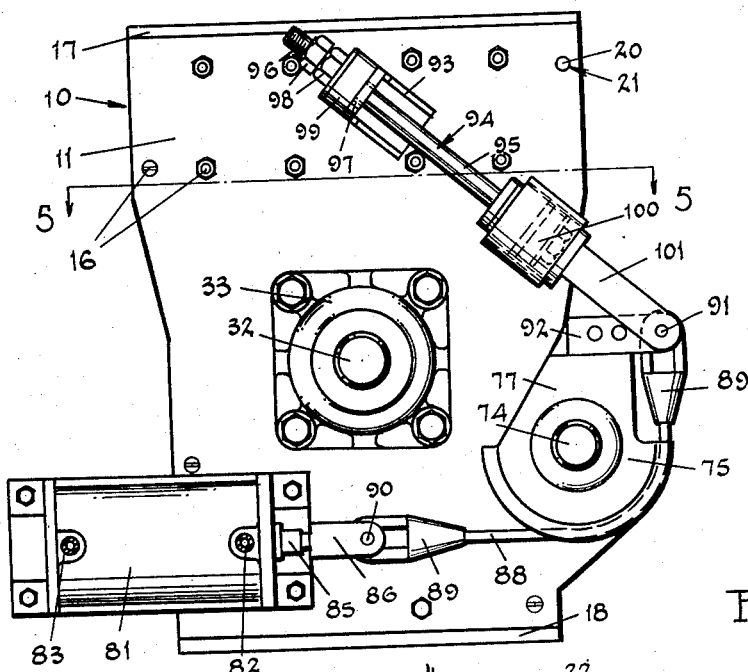

Figure 6 of said drawings illustrates an enlarged view of a partial section of the tooth-mounting crushing roller in the corncob crusher shown in the drawings.

Figure 7 is an enlarged perspective view of the corncob crushing roller and grate shown in their meshing relation.

The corncob crusher, which the drawings show, has the main elements comprising a housing 10, a crushing roller 30 and a crushing grate 60 in cooperative relation with the roller 30.

The housing 10

Opposite and upstanding end plates 11 and 12, back plate 14 and front plate 15 essentially form the housing 10. The end plates 11 and 12 are attached suitably, as by bolting 16 along their respective vertically extending edges to the opposite vertically extending edges of the back plate 14 to form a three-sided enclosure. Preferably and additionally, a suitable four-sided cap frame 17 and a likewise four-sided base frame 18 provide upper and lower end forms onto and about which the plates 11, 12 and 14 may be bolted.

The front plate 15 not only provides the fourth side of the housing 10 but also is mounted so that access may be had to within the housing. The plate 15 has pivot pins 20, each at a point on the plate 15 near the upper end of each of the plates vertically extending edges. The pins 20 are adapted to be received in trunnions 21, each at a point on each end plate 11 and 12 near the upper end of each of said end plates vertical edge opposite to that engaged by the back plate 14. The pins 20, pivoting in the trunnions 21, support the front plate 15 for swinging movements away from and toward the end plates 11 and 12 to allow access to within the space enclosed by the plates 11, 12, 14 and 15.

The housing 10 thus formed has an open upper end 22 and an open lower end 23. The open upper end 22 provides a receiving opening through which corncobs may enter the housing, as for example from a hopper 24 communicating with a bin or other supply of corncobs. The open lower end 23 provides a discharging opening through which the crushed corncob pieces may pass from the housing into storage or other process or equipment, as through the medium of a conveyor chute 25.

The housing 10 provides the means on or in which the other elements of the crusher are supported and also itself aids in the crushing operation by effecting a desirable corncob collecting, guiding and congesting. In order that this may be so, means is provided for engaging the front plate 15 to lock it against movement on its pivot pins 20. This last means preferably comprises shear pins 26 which are removably insertable into openings 27 in vertically extending edges of the front plate 15 to engage the approximating vertically extending edges of the end plates 11 and 12.

The shear pins 26, well known to the art in form and function, tend to hold the front plate 15 from swinging open on the pivotal pins 20 until pressures within the housing 10 applied to the front plate are sufficient to overcome the resistance of the pins 26 to shear. Then, the pins 26 fracture, releasing the plate 15 and permitting the cause of such pressures within the housing 10 to expand and spill out, without damaging the housing or the elements therein. The situation develops usually as a consequence of overload, unprecedented congestion or foreign materials in the batch being crushed. Without some such release means, the pressures so generated are often sufficient to burst a housing, throwing pieces of the housing like shrapnel about the vicinity and with considerable peril to the machine tender.

If desired, a suitable baffle plate 28 may be disposed within the housing 10 below the opening 22. The plate 28 serves to divert corncobs entering the housing from the hopper 24 to one side of the center of the housing and in a position to be readily engaged by the roller 30.

The crushing roller 30

The roller 30 comprises a substantially cylindrical body 31 having roll neck bearings 32 at each of its opposite ends. The bearings 32 rest and roll on journal bearing 33 mounted below the upper horizontal edge of each end plate 11 and 12 of the housing and about midway its width. One of the roll neck bearings 32 has a driving spline shaft extension 35 to which a suitable driving pulley 36 is keyed. The pulley 36 through a suitable belt 37 connects with a source of power, such as an electric motor (not shown) for rotating the roller 30 at high speed (600 to 1000 R. P. M.).

Figure 5:
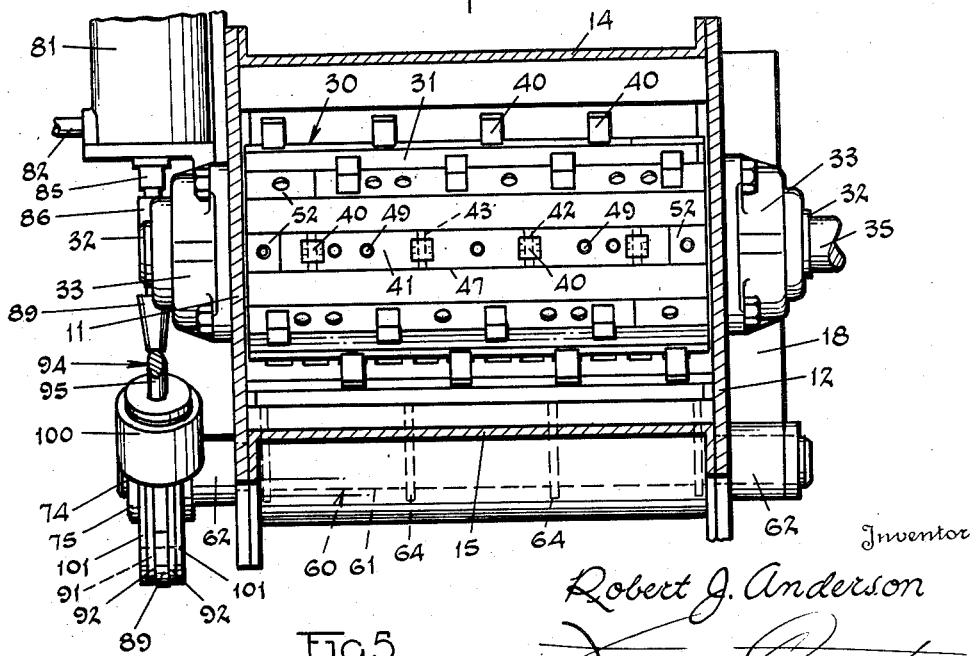
Figure 5 illustrates a view of a transverse section taken along the plane of the line 5—5 indicated in Figure 2.

In order that the roller 30 may perform its crushing function, it carries a plurality of teeth 40. In the embodiment of my invention described herein (see Figures 5 and 6 of the accompanying drawings) each tooth 40 comprises a rectangular parallelopiped of tool steel (450–550 Br.). To mount the teeth 40, I provide a plurality of bars 41, each preferably also being of parallelopiped form and having a plurality of rectangular openings 42 along its length and in spaced relation to each other and to the bar ends. Preferably, the openings 42 are precisely cut (minus .0005″) to the profile and dimension of a right section of each tooth 40. This means that the teeth 40 will press fit into each opening when the teeth are inserted endwise.

In order to further interlock the teeth 40 to the bars 41 which mount the teeth, I provide a tooth locking pin 43 for each tooth. Each tooth 40 has near its root a pair of bores 44, extending normal to each other and intersecting the major longitudinal axis of the tooth. The bores are each adapted to receive a pin 43 therein, when the same is inserted endwise. The bars 41 likewise have transverse bores 45 which when the teeth 40 are inserted in the bar openings 42 may be brought into registry with a bore 44 of the tooth 40 inserted in the bar opening. When such registration has been accomplished, the locking pin 43 may be inserted through the registering bores 44 and 45 to thus effectively further interlock the teeth 40 and bars 41.

When it may be later desired to draw individual teeth, as when a tooth's crown working edge or lateral face has become worn or chipped in work, one need merely knock out the locking pin 43 holding the worn or broken tooth and draw the tooth 40 from its socket in the bar opening 42. If the tooth 40 has crown edges or a lateral face which are fresh and unworn and could by rotation of the tooth about its major longitudinal axis be brought into working position, one may after so rotating the tooth, reinsert the old tooth in the bar opening 42 and again set the locking pin 42 to be ready for service on the fresh edge or face. If, on the other hand, the tooth 40 is beyond such use, a substitute new tooth 40 may be quickly placed in service position.

To mount the bars 41 on the body 31 of the roller 30, I provide the body 31 with a plurality of lineal slots 47. The slots 47 extend radially inwardly from the lateral surface of the body 31 from lines spaced around and parallel to the major longitudinal axis of the body 31. The slots 47 each have side wall surfaces 48 that are parallel to a plane which is both radial to said major longitudinal axis of the body 31 and medial to the width of the slot 47.

The dimensions of the slot 47 in width and depth is sufficient to enable placement of a bar 41 in nesting relation in each slot 47 in the body 31. Suitable fillister machine screws 49 extend through openings 50 in the bars 41 to engage threaded recesses 51 in the floor of the slot 47. When the bars 41 are so attached, the plurality of teeth 40 which the bars support extend radially with respect to the axis of rotation of the roller 30 and outwardly from spaced points about and beyond the span of the lateral surface of the roller body 31.

In order that the teeth 40 may be in a staggered relation to each other, when the bars 41 are mounted on the roller body, I preferably make the bars 41 somewhat shorter in length than the slots 47. Thus, I am enabled to locate bars 41 who neighbor each other in the installed sequence about the body 31 so that their ends are in staggered relation to the ends of the slots 47. Now, when these bars 41 are locked down by their machine screws 49, the teeth 40 they carry will be in staggered sequence to each other about the body 31. To fill in the open end spaces of the slots 47 which such positioning of the bars 41 might otherwise leave, I use variable length filler blocks such as those illustrated at 52 which like the bars 41 are suitably affixed to the body 31.

The crushing crate 60

Cooperating with the roller 30 and the teeth 40 supported thereon is the grate 60. The grate 60 is supported for rocking movement by a rock shaft 61. The shaft 61 is born by journal bearing surfaces 62 on the end plates 11 and 12. The bearing surfaces 62 are below and to that one side of the roller supporting journals 33 which is proximate to the front plate 15. Thus, the grate 60 and roller 30 and space between them become readily accessible when the plate 15 is swung into open position, as has been described.

The shaft 61 has mounted on it, at spaced points along its length, a plurality of strap plates 64. The outer edges of said plates 64 are joined together by a strut bar 65 and a guide bar 66. The plates 64 are suitably keyed to the shaft 61 so that the plates 64 with bars 65 and 66 form a crank bracket unit rockably supported by the shaft 61 on and within the housing 10. The bar 65 provides a mounting on which a tooth rack 68 of the grate is mounted.

The rack 68 has a spine portion 69 into which machine screws 70, extending through the bar 65, enter to lock the rack 68 on the bar 65. The rack also has a plurality of teeth 71 extending integrally to and at spaced points from the spine 69. The spacing of the teeth 71 and the disposition of the rack 68 is such that by rocking shaft 61, the grate supported teeth 71 and the roller supported teeth 40 will, in the rotation of the roller 30 pass each other in a shearing mesh relation. The depth to which the teeth 40 and 71 mesh in this relation depends on the angular position of the rack 68 due to the rock of the shaft 61.

I provide means for controlling the rocking movement of the rock shaft 61 which has many unique advantages. To connect such means for operation, the shaft 61 has a driving extension 74 which extends to the exterior of the housing 10. The extension 74 supports and is keyed to a pulley/crank 75. The pulley/crank 75 has a partial sheave groove 76 and a crank arm 77. The crank arm 77 is connected to a constant force exerting element which tends to cause the crank to move and exert torque of an unvarying degree in one direction. In addition, the crank arm is connected to an adjustable motion limiting part which tends to restrict the movement thereof in response to the power exerting element to an extent which will place the grate 60 in a desired position wherein the grate supported teeth 71 mesh with the roller supported teeth 40 to a desired depth.

Such constant force exerting element, in the structure shown in the accompanying drawing, is embodied in a fluid operated motor 80. The motor 80 has a cylinder 81 suitably mounted on and exterior of the end plate 11 of the housing 10. One end of the cylinder 81 is connected by piping 82 to a source of air under constant pressure indicated diagrammatically by the arrow 84 in Fig. 1 of the drawings and the other end of the cylinder 81 is connected by piping 83 to exhaust, as to atmosphere. Reciprocably supported in the cylinder 81 between the inlet and outlet therein is a slidably movable piston part 85. The movable piston part 85 has a clevis 86 at one end to which the crank arm 77 may be linked.

Figure 3:
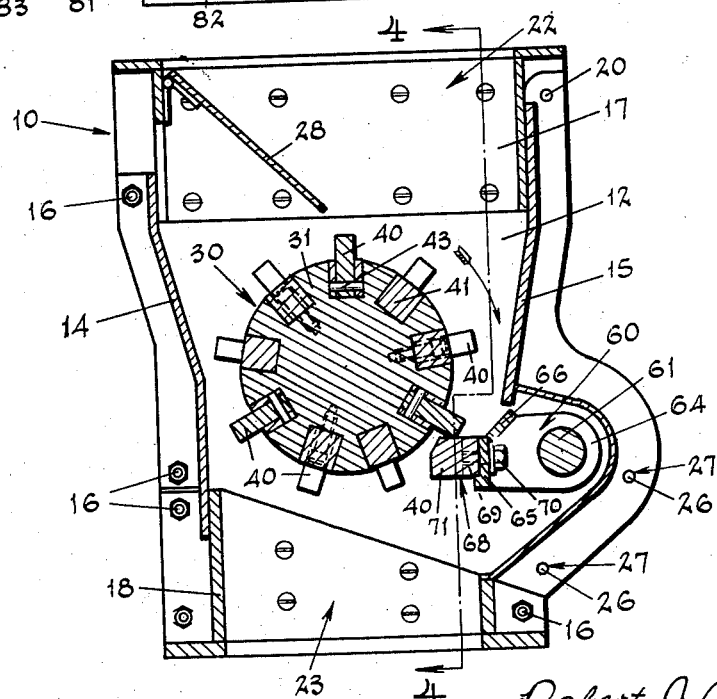
Figure 4:
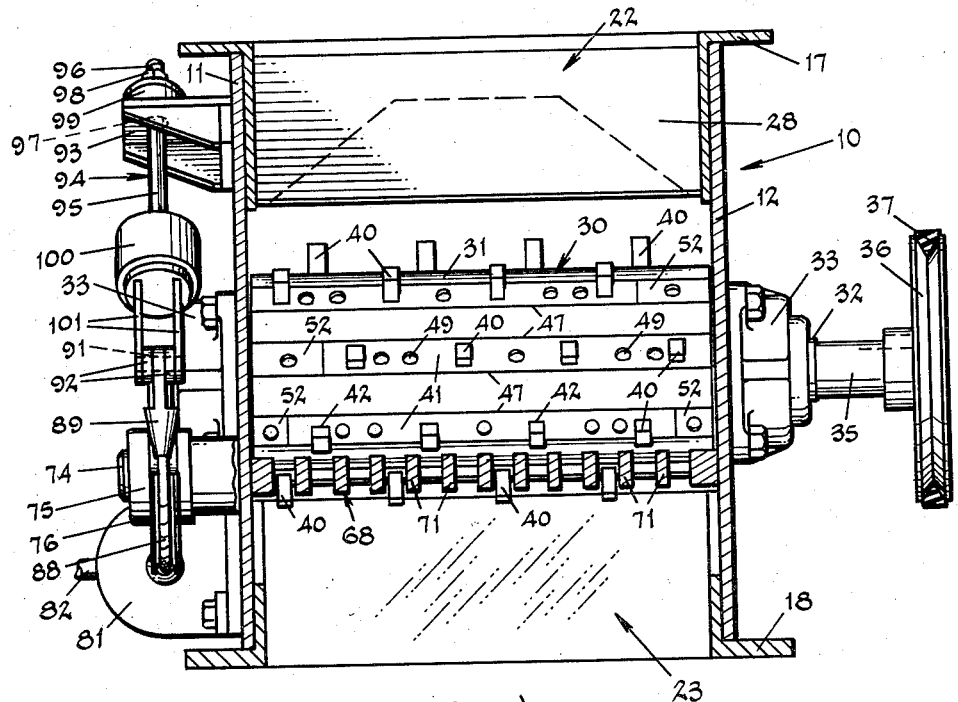
Figure 4 illustrates a view of a staggered section taken along the lines 4—4 indicated in Figure 3.

The linkage used in the form shown in my drawings comprises a flexible cable 88 having end grommets 89, one of which when placed within the arms of the clevis 86 is articulated thereto by clevis pin 90. The cable 88 passes around the sheave groove 76 of the pulley/crank 75 and has its other grommeted end 89 located to be engaged by a clevis pin 91 of a clevis 92 formed on the pulley/crank 75. It will be seen from this that the shaft 61 will be urged by the motor 80 to move angularly in a direction which swings the grate supported teeth upwardly as viewed in Figure 3 of the accompanying drawing, into greater proximity to the roller 30 and deeper mesh with the roller supported teeth 40.

To limit such movement to one of a desired extent, the pulley/crank 75 is connected to an adjustable motion limiting part. Such part is shown here embodied in the combination of a bracket 93 affixed suitably to the exterior of end plate 11 of the housing 10 and a link 94 of adjustable length. The link 94 has a rod portion 95, one end 96 of which is threaded and extends through and is reciprocably supported in an opening 97 in the bracket 93. The end 96 of the rod 95 has a lock nut and washer assembly 98 threaded thereto, by which the effective length of the rod 95 may be varied. If desired, a suitable resilient bumper sleeve 99, on the rod 95 may serve to cushion the engagement between the washer of assembly 98 and the bracket 93. The other end of the rod 95 has a clevis fitting 100 whose arms 101 embrace the arms of clevis 92 and are connected thereto by clevis pin 91. Thus, the link 94 in its engagement with bracket 93 limits the movement of the crank arm 77 induced by motor 80, and hence the rock of the shaft 61 and the grate 60 in the direction causing greater depth of mesh between the teeth 40 and 71.

By backing off or turning down the lock nut and washer assembly 98, the motor 80 may be freed or become even more restrained to move the shaft 61 and grate to different desired positions at which the grate supported teeth 71 mesh more or less deeply with the roller supported teeth 40. These adjustments, that is, of the lock nut and washer assembly 98, may be effected even while the roller 30 is being rotated by its driving motor. The operator may, in the course of making these adjustments, watch and sample the machine production and make further corrective adjustments until the machine production accords with the specifications of crush size to which the operator is adjusting.

Operation

Assuming that the hopper 24 contains a supply of corncobs and that the motor rotating roller 30 is running, the corncobs will enter the housing 10 through opening 22 and, guided by baffle plate 28, will gravitate toward the rapidly turning roller 30. The corncobs tend to congest in the space between the roller 30 and the front plate 15 and from there are forced or fall to positions across or into the space between the grate supported teeth 71. The roller supported teeth 40 then repeatedly engage the corncobs and snap or break them into pieces until the pieces are of a size that they sift through between the crowns of the teeth 40 and 71 and the land areas between adjacent teeth on the roller or grate, as the case may be.

Should this space be large so that the pieces sifting through are larger than desired, the operator rotates the lock nut and washer assembly 98 to turn same down on the rod 95. This through the pulley/crank 75 rocks the grate 60 until the grate supported teeth 71 are closer to the roller 30 and more deeply in mesh with the roller supported teeth 40. Hence, the space between the teeth and facing lands will be less than it was. This produces a finer sifting of crushings and a finer resultant grind.

Should, however, a coarser grind be desired, the operator merely backs off on the lock nut and washer assembly 98 allowing the motor 80 to draw upon the pulley/crank 75 and rock the grate 60 away from the roller 30 so that their respectively supported teeth are in shallower mesh. This allows larger pieces of the crushed corncobs to slip between the teeth and facing lands.

As the crushings pass between the teeth of the roller and grate, the crushings fall out of the discharge opening 23 of the housing 10 and are conveyed away through the chute 25. It is well here to note that whether the grate 60 is rocked to produce fine or coarse crushing, the force with which the grate is retained in its adjusted position is neither greater nor less than the force which operated to retain the grate in its position before the adjustment was made.

In the event a mass of corncobs or the presence of foreign materials, in the charge entering the housing 10, present such resistance to the movement of the roller 30 as to overload the crusher, the grate 60 yields. In yielding, the resisting mass or materials exerts against the grate supported teeth 71 causing the grate to rock downward as view in Figure 3 of the accompanying drawings, and away from the roller 30. The movement of the grate 60 to relieve overload conditions is resisted by the motor 80 with a constant unvarying force at all stages in its movement and notwithstanding the extent of the displacement of the grate. This is unique over the constructions of the prior art. There the arrangements are such that resistance to movement increases in proportion to displacement from the normal operational positions of the elements. As a consequence, breakage very often occurs in the prior art structure even through they may contain a so-called overload release provision.

Of course, should the overload be of such order, suddenness or nature as to exert destructive forces on the housing 10, the shear pins 26 will fracture releasing the plate 15. However, under normal operating conditions dealing with the expected range of overload, the yielding of the grate is entirely sufficient.

I claim:
1. In a corncob crusher comprising the combination of a housing; a toothed roller rotatably supported on and within said housing; means operatively connected to said roller for rotating the roller; a tooth grate rockably supported on and within said housing in spaced relation to said roller and adapted as the roller rotates to allow the roller teeth to pass between and in mesh with the grate teeth to a depth depending on the angular position of the grate on its rocking axis whereby corncobs within the housing are engaged and crushed by the roller and grate teeth into pieces of a size depending on the depth at which said roller and grate teeth mesh; and means for rocking the grate to any selected of a plurality of adjusted angular positions and thus to vary the depth at which the roller and grate teeth mesh and for yieldably biasing the grate to said selected adjusted angular position with an unvarying force notwithstanding the relation of a selected adjusted angular position to other angular positions of the grate and notwithstanding the degree of displacement of the grate from said selected adjusted angular position in allowing passage between the roller and grate of an overload of corncobs or foreign material exerting a greater degree of resistance to crushing than corncobs exert, said means including a crank in engagement with said grate and adapted to rock when the grate rocks; a link element in engagement with said crank; a motor having a reciprocably movable part in engagement with said link; a source of energy of a constant amount in operative communication with said motor and tending to move the movable motor part in one direction and exerting a yielding resistance of a constant degree to a movement of the movable motor part in an opposite direction; a grate movement limiting member on and adjustable relative to the grate and adapted to engage said housing when the grate rocks in a direction locating the roller and grate supported teeth in increasing mesh and to thus adjustably limit the extent of the rock of said grate in said direction to a rocking effecting a desired degree of tooth meshing; the disposition and range of adjustment of said member bearing a relation to the stroke of the motor driven reciprocable part and to the grate crank being such that the movement of the movable motor part in one direction is to an extent less than its capacity for movement in that direction and moves the grate to the full extent permitted by said member and to a position at which the roller and grate teeth mesh to a desired depth to effect, on rotation of the roller, a crushing of corncobs to a desired crushed size and at the same time yieldably biases said grate to said position with an unvarying force notwithstanding any displacement of the grate from said position as a consequence of the passage of an overload of corncobs or foreign material resistant to crushing between the roller and the grate.

2. In a corncob crusher as described in claim 1 in which said motor is a fluid motor and said source of energy is a source of fluid under unchanging pressure.

3. In a corncob crusher as described in claim 2 in which said fluid motor includes a pneumatic cylinder on the housing; said movable motor part is a pneumatic piston within and slidably movable relative to said cylinder; said crank has a sheave portion; said member is a rod slidably mounted on the housing and having a nut threaded on one end thereof to adjustably vary the effective length of the rod; and said link is a flexible cable, one end of which is in engagement with said crank, the cable portion between the ends thereof being in a bend about and in engagement with said sheave portion of the crank.

4. In a corncob crusher comprising the combination of a housing and a roller rotatably supported on and within said housing for crushing corncobs introduced into the housing, said roller comprising a substantially cylindrical body having roll neck bearings at each end and a plurality of lineal slots extending radially inwardly from spaced lines on the lateral surface of the body around and substantially parallel to the major longitudinal axis of said body; a plurality of bars, each of said bars in right cross section being substantially of the same profile and dimension as that of each of said slots; a plurality of teeth of rectangular parallelopiped shape; each of said bars having along its length a plurality of openings in spaced relation to each other and to the ends of said bars, the dimension and profile of said openings in cross-section being the same as that of a right section of each of said teeth and providing a press fit between a tooth and the portions of the bar about each bar opening and whereby each of said teeth may be inserted endwise into a bar opening and when so inserted will be tightly held in said opening; and a plurality of affixing elements in engagement with each of said bars and the body for locking the bars in the said slots thus to locate the teeth in spaced relation about the roll body and extending radially to the major longitudinal axis thereof and to points outwardly of and beyond the span of the roll body lateral surface.

5. In a corncob crusher comprising the combination of a housing and a roller rotatably supported on and within said housing for crushing corncobs introduced into the housing, said roller comprising a substantially cylindrical body having roll neck bearings at each end and a plurality of lineal slots extending radially inwardly from spaced lines on the lateral surface of the body around and substantially parallel to the major longitudinal axis of said body; a plurality of bars, each of said bars in right cross section being substantially of the same profile and dimension as that of each of said slots and being of a length less than the length of each of said slots; a plurality of teeth of rectangular parallelopiped shape; each of said bars having along its length a plurality of openings in spaced relation to each other and to the ends of said bars, the dimension and profile of said openings in cross-section being the same as that of a right section of each of said teeth and providing a press fit between a tooth and the portions of the bar about each bar opening and whereby each of said teeth may be inserted endwise into a bar opening without regard to which of the tooth's several lateral surfaces faces circumferentially of the body and when so inserted will be tightly held in said opening; and a plurality of affixing elements in engagement with each of said bars and the body for locking the bars in the said slots with the bar ends in staggered sequence with reference to the slot ends around the body thus to locate the teeth inserted in said bar openings in staggered spaced relation about the roll body and extending radially to the major longitudinal axis thereof and to points outwardly of and beyond the span of the roll body lateral wall.

6. In a corncob crusher as described in claim 5, in which the side wall surfaces of each of said slots are parallel to and spaced from a plane which is both radial to said major longitudinal axis of the body and medial to the width of the slot.

7. In a corncob crusher comprising the combination of a rotatable toothed roller, a toothed grate, means operatively connected to said roller for rotating it relative to the grate, and a housing for supporting said roller and grate, said housing including two opposite upstanding end plates and upstanding front and back plates, each of the opposite vertical edges of the back plate being in engagement with an opposite vertical edge of one of said opposite end plates to form a three sided enclosure having open upper and lower ends, the upper open end providing a corncob receiving opening into the housing and the lower open end providing a crushed corncob discharge opening from within the housing; each of said opposite end plates having a pair of spaced bearing surfaces in alignment with corresponding bearing surfaces on the other said opposite end plates and adapted to support said roller and grate thereon in operative contiguity between said housing openings and athwart the way through said housing from one to the other of said housing openings; pivotal supporting means in engagement with each of the upper side edges of the front plate and with the upper side edge of each end plate opposite to the side edge thereof in engagement with the back plate and adapted to pivotally support the front plate across the open side of the enclosure formed by the end and back plates and to provide, when swung outwardly from said end plates, access to within the housing independent of the upper and lower openings; and means in removable engagement with said front plate for locking the front plate against pivotal movement on said pivotal supporting means whereby corncobs introduced to the housing through the upper end openings are confined and caused in passing through the housing to seek passage between the roller and the grate.

8. In a corncob crusher, the combination described in claim 7 in which the last named means includes a shear pin element predeterminedly fracturable to release the front plate for pivotal movement when a pressure of an undesired magnitude on the front plate is generated within the housing due to a congestion of corncobs or foreign material in the housing.

9. In a corncob crusher, the combination described in claim 7 in which one of said bearing surfaces on each end plate is below the upper edge and substantially midway the width of the end plate and is adapted to rotatably support the roller and the other of said bearing surfaces on each end plate is below and horizontally spaced from the first mentioned bearing surface and nearer to the front plate, and is adapted to support the grate whereby the zone within the housing between the grate and roller will be exposed immediately to access upon moving the front plate on its said pivotal supporting means away from the end plates.

References Cited in the file of this patent

UNITED STATES PATENTS

| 142,426 | Wilder | Sept. 2, 1873 |
| 1,200,384 | Marquette | Oct. 3, 1916 |
| 1,772,321 | Ossing | Aug. 5, 1930 |
| 1,981,415 | Kennedy | Nov. 20, 1934 |
| 2,297,604 | Bateman | Sept. 29, 1942 |
| 2,756,002 | Brake | July 24, 1956 |

FOREIGN PATENTS

| 468,500 | France | Apr. 25, 1914 |